United States Patent
Jang et al.

(10) Patent No.: US 12,492,278 B2
(45) Date of Patent: Dec. 9, 2025

(54) METHOD OF PREPARING GRAFT POLYMER

(71) Applicant: LG CHEM, LTD., Seoul (KR)

(72) Inventors: Ji Uk Jang, Daejeon (KR); Dae Woo Lee, Daejeon (KR); Jae Bum Seo, Daejeon (KR); Jung Tae Park, Daejeon (KR); Jung Rae Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 484 days.

(21) Appl. No.: 18/013,202

(22) PCT Filed: Nov. 19, 2021

(86) PCT No.: PCT/KR2021/017042
§ 371 (c)(1),
(2) Date: Dec. 27, 2022

(87) PCT Pub. No.: WO2022/114678
PCT Pub. Date: Jun. 2, 2022

(65) Prior Publication Data
US 2023/0250210 A1    Aug. 10, 2023

(30) Foreign Application Priority Data
Nov. 27, 2020    (KR) .................. 10-2020-0163143

(51) Int. Cl.
*C08F 285/00*    (2006.01)
(52) U.S. Cl.
CPC ................. *C08F 285/00* (2013.01)
(58) Field of Classification Search
CPC .... C08F 279/02; C08F 222/40; C08F 220/44; C08F 212/08; C08F 285/00
See application file for complete search history.

(56) References Cited

U.S. PATENT DOCUMENTS

| | | | | |
|---|---|---|---|---|
| 4,954,571 A | * | 9/1990 | Iwamoto | C08L 51/04 525/205 |
| 5,091,470 A | * | 2/1992 | Wolsink | C08L 51/04 525/73 |
| 2010/0168333 A1 | * | 7/2010 | Hong | C08L 51/04 525/73 |
| 2017/0275452 A1 | | 9/2017 | Seo et al. | |
| 2021/0163652 A1 | | 6/2021 | Jang et al. | |

FOREIGN PATENT DOCUMENTS

| | | |
|---|---|---|
| CN | 1986635 A | 6/2007 |
| CN | 101058624 B | 6/2011 |
| CN | 102471559 A | 5/2012 |
| CN | 111278913 A | 6/2020 |
| CN | 111971317 A | 11/2020 |
| EP | 3176193 A1 | 6/2017 |
| JP | H05-078431 A | 3/1993 |
| KR | 10-2003-0034928 A | 7/2004 |
| KR | 10-2004-0064048 A | 7/2004 |
| KR | 10-2008-0017780 A | 2/2008 |
| KR | 2008-0035327 A | 4/2008 |
| KR | 10-2010-0076663 A | 7/2010 |
| KR | 10-2011-0058540 A | 6/2011 |
| KR | 10-2012-0078604 A | 7/2012 |
| KR | 10-1457089 B1 | 10/2014 |
| KR | 10-2016-0085159 A | 7/2016 |
| KR | 10-2016-0150052 A | 12/2016 |
| KR | 10-1838163 B1 | 3/2018 |
| KR | 10-2020-0056848 A | 5/2020 |

OTHER PUBLICATIONS

International Search Report (with partial translation) and Written Opinion dated Mar. 2, 2022, for corresponding International Patent Application No. PCT/KR2021/017042.
Extended European Search Report issued in application 21898504.2 dated Mar. 22, 2024.
Office Action issued in KR application 10-2020-0163143 dated May 27, 2024.
Office Action issued on Nov. 8, 2024 for the corresponding Chinese patent application 202180043803.3.

* cited by examiner

*Primary Examiner* — Mark S Kaucher
(74) *Attorney, Agent, or Firm* — Morgan, Lewis & Bockius LLP

(57) ABSTRACT

The present disclosure relates to a method of preparing a graft polymer, which includes: performing primary continuous polymerization by adding a diene-based rubber polymer and an aromatic vinyl-based monomer to a first reactor; and performing secondary continuous polymerization by adding the polymerization product discharged from the first reactor, a maleimide-based monomer, and a vinyl cyanide-based monomer to a second reactor.

10 Claims, No Drawings

METHOD OF PREPARING GRAFT POLYMER

TECHNICAL FIELD

Cross-Reference to Related Application

This application claims priority to and the benefit of Korean Patent Application No. 10-2020-0163143, filed on Nov. 27, 2020, the disclosure of which is incorporated herein by reference in its entirety.

Technical Field

The present invention relates to a method of preparing a graft polymer, and specifically, to a method of preparing a polymer which is capable of improving heat resistance, light resistance, and weather resistance.

BACKGROUND ART

Conventionally, a thermoplastic resin composition including a diene-based graft polymer prepared by emulsion polymerization and an α-methyl styrene/acrylonitrile non-grafted polymer or a thermoplastic resin composition including a diene-based graft polymer prepared by emulsion polymerization and a n-phenylmaleimide/styrene/acrylonitrile non-grafted polymer has been used as a heat-resistant resin composition.

The heat-resistant resin composition exhibits excellent impact resistance or excellent heat resistance, but an excessive amount of gas is generated during injection due to the diene-based graft polymer prepared by emulsion polymerization, leading to degradation of thermal stability and appearance characteristics.

In order to improve the above problem, a heat-resistant diene-based graft polymer having an improved polymerization conversion rate was developed by further adding a maleimide-based monomer in preparation of a diene-based graft copolymer and performing continuous bulk polymerization. This heat-resistant diene-based graft polymer has been mainly used as an automotive interior material due to having excellent heat resistance.

However, recently, there is an increasing demand for light resistance and weather resistance as well as heat resistance. Accordingly, since automotive material companies are conducting a PV1303 test and gray scale evaluation, it is necessary to develop a heat-resistant diene-based graft polymer that is able to meet the above condition.

RELATED-ART DOCUMENTS

Patent Documents (Patent Document 1) KR2012-0078604A

DISCLOSURE

Technical Problem

The present invention is directed to providing a method of preparing a graft polymer which is capable of improving the heat resistance, light resistance, and weather resistance of a graft polymer.

Technical Solution

The present invention provides (1) a method of preparing a graft polymer, which includes: performing primary continuous polymerization by adding a diene-based rubber polymer and an aromatic vinyl-based monomer to a first reactor; and performing secondary continuous polymerization by adding the polymerization product discharged from the first reactor, a maleimide-based monomer, and a vinyl cyanide-based monomer to a second reactor.

In addition, the present invention provides (2) a method of preparing a graft polymer in which each of the polymerization product, the maleimide-based monomer, and the vinyl cyanide-based monomer starts to be added when a polymerization conversion rate reaches 25 to 35% according to the method (1).

In addition, the present invention provides (3) a method of preparing a graft polymer in which the maleimide-based monomer is added in a dissolved state in the vinyl cyanide-based monomer according to the method (1) or (2).

In addition, the present invention provides (4) a method of preparing a graft polymer in which a weight ratio of the maleimide-based monomer and the vinyl cyanide-based monomer is 15:85 to 25:75 according to the method (3).

In addition, the present invention provides (5) a method of preparing a graft polymer in which an amount of the maleimide-based monomer added in the secondary continuous polymerization is 1 to 10 parts by weight with respect to 100 parts by weight of the sum of the diene-based rubber polymer, aromatic vinyl-based monomer, maleimide-based monomer, and vinyl cyanide-based monomer added in the method of preparing a graft polymer according to any one of the methods (1) to (4).

In addition, the present invention provides (6) a method of preparing a graft polymer in which an amount of the vinyl cyanide-based monomer added in the secondary continuous polymerization is 15 to 27 parts by weight with respect to 100 parts by weight of the sum of the diene-based rubber polymer, aromatic vinyl-based monomer, maleimide-based monomer, and vinyl cyanide-based monomer added in the method of preparing a graft polymer according to any one of the methods (1) to (5).

In addition, the present invention provides (7) a method of preparing a graft polymer in which an amount of the diene-based rubber polymer added in the primary continuous polymerization is 7 to 17 parts by weight with respect to 100 parts by weight of the sum of the diene-based rubber polymer, aromatic vinyl-based monomer, maleimide-based monomer, and vinyl cyanide-based monomer added in the method of preparing a graft polymer according to any one of the methods (1) to (6).

In addition, the present invention provides (8) a method of preparing a graft polymer in which an amount of the aromatic vinyl-based monomer added in the primary continuous polymerization is 55 to 67 parts by weight with respect to 100 parts by weight of the sum of the diene-based rubber polymer, aromatic vinyl-based monomer, maleimide-based monomer, and vinyl cyanide-based monomer added in the method of preparing a graft polymer according to any one of the methods (1) to (7).

In addition, the present invention provides (9) a method of preparing a graft polymer in which the diene-based rubber polymer is added in a dissolved state in the aromatic vinyl-based monomer according to any one of the methods (1) to (8).

In addition, the present invention provides (10) a method of preparing a graft polymer in which the diene-based rubber polymer is one or more selected from the group consisting of a butadiene rubber polymer and a styrene-butadiene rubber polymer according to any one of the methods (1) to (9).

In addition, the present invention provides (11) a method of preparing a graft polymer in which the continuous polymerization is continuous bulk polymerization according to any one of the methods (1) to (10).

Advantageous Effects

According to a method of preparing a graft polymer of the present invention, the addition amounts of a maleimide-based monomer and a vinyl cyanide-based monomer can be increased, and thus the heat resistance, light resistance, weather resistance, and color characteristics of a graft polymer can be improved.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

As used herein, the term "polymerization conversion rate" may be calculated by the following equation:

Polymerization conversion rate (%)={(Total weight of monomers added until polymerization is terminated)−(Total weight of unreacted monomers at the time point where a polymerization conversion rate is measured)}/(Total weight of monomers added until polymerization is terminated)×100

As used herein, the term "bulk polymerization" may use a small amount of an organic solvent to easily dissolve a solid-phase diene-based rubber polymer, unlike general bulk polymerization that does not use a solvent at all.

As used herein, the term "diene-based rubber polymer" may be a synthetic rubber prepared by crosslinking-polymerization of a diene-based monomer; or a synthetic rubber prepared by crosslinking-polymerization of a diene-based monomer and a monomer copolymerizable with the diene-based monomer.

The diene-based monomer may be one or more selected from the group consisting of 1,3-butadiene, isoprene, chloroprene, and piperylene, with 1,3-butadiene being preferred.

The monomer copolymerizable with the diene-based monomer may be one or more selected from the group consisting of an aromatic vinyl-based monomer and a vinyl cyanide-based monomer.

The diene-based rubber polymer may be one or more selected from the group consisting of a butadiene rubber polymer and a styrene-butadiene rubber polymer, and a mixture thereof is preferably used.

As used herein, the term "aromatic vinyl-based monomer" may mean one or more selected from the group consisting of styrene, α-methyl styrene, p-methyl styrene, 2,4-dimethyl styrene, p-bromostyrene, o-bromostyrene, and p-chlorostyrene, with styrene being preferred.

As used herein, the term "vinyl cyanide-based monomer" may mean one or more selected from the group consisting of acrylonitrile, methacrylonitrile, and ethacrylonitrile, with acrylonitrile being preferred.

As used herein, the term "maleimide-based monomer" may mean one or more selected from the group consisting of maleimide, N-methylmaleimide, N-cyclohexylmaleimide, N-phenylmaleimide, N-(4-chlorophenyl)maleimide, 2-methyl-N-phenylmaleimide, and N-(p-methoxyphenyl)maleimide, with N-phenylmaleimide being preferred.

Method of Preparing Graft Polymer

A method of preparing a graft polymer according to an embodiment of the present invention includes the steps of: 1) performing primary continuous polymerization by adding a diene-based rubber polymer and an aromatic vinyl-based monomer to a first reactor; and (2) performing secondary continuous polymerization by adding the polymerization product discharged from the first reactor, a maleimide-based monomer, and a vinyl cyanide-based monomer to a second reactor.

When continuous polymerization is performed by adding a diene-based rubber polymer, an aromatic vinyl-based monomer, a maleimide-based monomer, and a vinyl cyanide-based monomer to a first reactor at the beginning of polymerization, phase transformation into a graft polymer occurs in the first reactor, leading to a rapid increase in the viscosity of the reaction solution and rapid heat generation. Due to such problems, it is difficult to increase the addition amount of a maleimide-based monomer that improves heat resistance and a vinyl cyanide-based monomer that improves weather resistance and light resistance.

However, when a maleimide-based monomer and a vinyl cyanide-based monomer are added to a second reactor, that is, when the addition point of a maleimide-based monomer and a vinyl cyanide-based monomer is adjusted, diene-based rubber polymer particles (preliminary graft polymer), onto which an aromatic vinyl-based monomer unit is grafted, and an aromatic vinyl-based polymer are formed in a first reactor, and thus the viscosity of the reaction solution is not rapidly increased, and heat is not rapidly generated. Also, since a maleimide-based monomer and a vinyl cyanide-based monomer are added to a second reactor, the addition amount thereof may be increased, and thus a graft polymer whose heat resistance, weather resistance, and light resistance are excellent can be prepared.

In addition, when the aromatic vinyl-based monomer is polymerized in the first reactor to increase the amount of aromatic vinyl-based polymer, phase transformation into a structure in which a diene-based rubber polymer is dispersed in the aromatic vinyl-based polymer occurs, an aromatic vinyl-based monomer unit is grafted onto a diene-based rubber polymer, and an aromatic vinyl-based polymer is present in a diene-based rubber polymer, and thus a preliminary graft polymer that is spherical and uniform may be prepared. Also, even when a polymerization product including a preliminary graft polymer, a maleimide-based monomer, and a vinyl cyanide-based monomer are polymerized in a second reactor, the maleimide-based monomer and the vinyl cyanide-based monomer are grafted onto the preliminary graft polymer while growing into polymers, and thus a graft polymer having improved impact resistance due to its excellent shape may be prepared.

However, when a maleimide-based monomer and a vinyl cyanide-based monomer are present in a first reactor, a graft polymer in which an aromatic vinyl-based polymer is present in a diene-based rubber polymer may be prepared, but the preparation of a graft polymer having a spherical and uniform shape is difficult, and thus the impact resistance of the graft polymer may be degraded.

Hereinafter, the method of preparing a graft polymer according to an embodiment of the present invention will be described in detail.

1) Primary Continuous Polymerization

First, primary continuous polymerization is performed by adding a diene-based rubber polymer and an aromatic vinyl-based monomer to a first reactor.

In the primary continuous polymerization, when a diene-based rubber polymer and an aromatic vinyl-based monomer are added, uniform rubber polymer particles may be formed during phase transformation into a graft polymer, and thus impact resistance may be improved. Also, the viscosity of the reaction solution is not rapidly increased, and heat is not rapidly generated, and thus polymerization stability may be improved. Also, the precipitation of the diene-based rubber polymer dissolved in the aromatic vinyl-based monomer due to a maleimide-based monomer may be prevented.

The amount of the diene-based rubber polymer added in the primary continuous polymerization may be 7 to 17 parts by weight, and preferably, 10 to 15 parts by weight with respect to 100 parts by weight of the sum of the diene-based rubber polymer, aromatic vinyl-based monomer, maleimide-based monomer, and vinyl cyanide-based monomer added in the method of preparing a graft polymer. When the above-described range is satisfied, the impact resistance of a graft polymer can be improved without degrading surface characteristics.

The amount of the aromatic vinyl-based monomer added in the primary continuous polymerization may be 55 to 67 parts by weight, and preferably, 57 to 65 parts by weight with respect to 100 parts by weight of the sum of the diene-based rubber polymer, aromatic vinyl-based monomer, maleimide-based monomer, and vinyl cyanide-based monomer added in the method of preparing a graft polymer. When the above-described range is satisfied, the processability of a graft polymer can be improved.

In order to prepare a graft polymer in which the diene-based rubber polymer is uniformly dispersed, the diene-based rubber polymer is preferably added in a dissolved state in the aromatic vinyl-based monomer.

In the primary continuous polymerization, an organic solvent may be further added to more easily dissolve the diene-based rubber polymer. The organic solvent may be one or more selected from the group consisting of methyl ethyl ketone, ethylbenzene, toluene, carbon tetrachloride, and chloroform.

The organic solvent is preferably included in an amount of 30 parts by weight or less with respect to 100 parts by weight of the sum of the diene-based rubber polymer, the aromatic vinyl-based monomer, the maleimide-based monomer, and the vinyl cyanide-based monomer in order to prevent polymerization from not being smoothly performed due to a decrease in the viscosity of the reaction product including the diene-based rubber polymer and the aromatic vinyl-based monomer.

2) Secondary Continuous Polymerization

Subsequently, secondary continuous polymerization is performed by adding the polymerization product discharged from the first reactor, a maleimide-based monomer, and a vinyl cyanide-based monomer to a second reactor.

When a maleimide-based monomer and a vinyl cyanide-based monomer are added at the above-described time point, the addition amount thereof may increase, and thus the heat resistance, light resistance, and weather resistance of a graft polymer may be improved. Also, the maleimide-based monomer and the vinyl cyanide-based monomer are subjected to graft polymerization onto the diene-based rubber particles onto which the aromatic vinyl-based monomer unit is grafted, which has been prepared in the first reactor, and thus a graft polymer may grow.

Each of the polymerization product, the maleimide-based monomer, and the vinyl cyanide-based monomer may start to be added when a polymerization conversion rate reaches 25 to 35%, and preferably, 27 to 33%. When the above-described time point is satisfied, the heat resistance and light resistance of a graft polymer can be improved.

Since the maleimide-based monomer is in a solid phase at room temperature and has high solubility in the vinyl cyanide-based monomer, it is preferably added in a dissolved state in the vinyl cyanide-based monomer to easily perform continuous polymerization and increase a polymerization conversion rate.

A weight ratio of the maleimide-based monomer and the vinyl cyanide-based monomer may be 15:85 to 25:75, and preferably, 17:83 to 23:77. When the above-described condition is satisfied, the maleimide-based monomer can be sufficiently dissolved in the vinyl cyanide-based monomer.

The amount of the maleimide-based monomer added in the secondary continuous polymerization may be 1 to 10 parts by weight, and preferably, 3 to 8 parts by weight with respect to 100 parts by weight of the sum of the diene-based rubber polymer, aromatic vinyl-based monomer, maleimide-based monomer, and vinyl cyanide-based monomer added in the method of preparing a graft polymer. When the above-described condition is satisfied, a graft polymer whose light resistance and heat resistance are improved can be prepared.

The amount of the vinyl cyanide-based monomer added in the secondary continuous polymerization may be 15 to 27 parts by weight, and preferably, 17 to 25 parts by weight with respect to 100 parts by weight of the sum of the diene-based rubber polymer, aromatic vinyl-based monomer, maleimide-based monomer, and vinyl cyanide-based monomer added in the method of preparing a graft polymer. When the above-described condition is satisfied, a graft polymer whose light resistance, weather resistance, and color characteristics are excellent can be prepared.

The continuous polymerization is preferably continuous bulk polymerization to prepare a high-purity product with a high polymerization conversion rate, and the continuous bulk polymerization may be performed by addition to two to three reactors to increase a polymerization conversion rate. Also, when a solvent is used in the continuous polymerization, continuous solution polymerization is preferred and may be performed by addition to two to three reactors to increase a polymerization conversion rate.

Meanwhile, when the polymerization is terminated, removing unreacted monomers included in the obtained polymerization product may be further performed.

The removal may include: primarily removing unreacted monomers from the polymerization product at a first temperature and a first pressure; and secondarily removing unreacted monomers from the polymerization product from which unreacted monomers have been removed at a second temperature and a second pressure.

When the two-step removal is performed, the amount of residual monomers and volatile organic compounds in a graft polymer may be minimized, and thus a graft polymer having improved odor characteristics may be prepared. Also, since unreacted monomers which are residual monomers may be recovered and recycled, manufacturing costs may be reduced.

In this case, it is preferable that the first temperature is lower than the second temperature and the first pressure is higher than the second pressure. When the above-described condition is satisfied, the polymerization product from which unreacted monomers have been primarily removed can have a viscosity that allows the product to be easily transferred to a devolatilization tank in which secondary removal is to be performed.

The first temperature may be 140 to 180° C., and preferably, 150 to 170° C. Also, the first pressure may be 400 to 600 torr, and preferably, 450 to 550 torr. When the above-described condition is satisfied, not only unreacted monomers are removed without excessive energy consumption, but also viscosity is appropriately maintained, and thus the polymerization product from which unreacted monomers have been primarily removed can be easily transferred to a second volatilization tank in which secondary removal is to be performed.

The second temperature may be 210 to 250° C., and preferably, 220 to 240° C. Also, the second pressure may be 20 torr or less, and preferably, 5 to 15 torr. When the above-described condition is satisfied, unreacted monomers can be removed as much as possible from the polymerization product that has been subjected to the primary removal.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

Example 1

<Preparation of Graft Polymer>

4.46 parts by weight of a butadiene rubber polymer (BR), 7.92 parts by weight of a styrene-butadiene rubber polymer (SBR), 0.15 parts by weight of an antioxidant (Irganox 1076 commercially available from BASF), and 0.01 parts by weight of t-dodecyl mercaptan were dissolved in 30.96 parts by weight of ethylbenzene (EB) and 56.66 parts by weight of styrene (S) to prepare a first reaction solution.

20.78 parts by weight of N-phenylmaleimide (PMI) was dissolved in 79.22 parts by weight of acrylonitrile (AN) to prepare a second reaction solution.

The first reaction solution was continuously added to a first reactor (inner temperature: 105° C.) at a rate of 9.69 kg/hr and subjected to primary continuous polymerization while being allowed to reside for 2.35 hours. In this case, 0.02 parts by weight of t-butylperoxy-2-ethylhexanoate was continuously added together with the first reaction solution to the first reactor at a rate of 0.024 kg/hr.

The first polymerization solution continuously discharged from the first reactor was continuously added to a second reactor (inner temperature: 130° C.) at a rate of 9.69 kg/hr and subjected to secondary continuous polymerization while being allowed to reside for 1.16 hours.

When the first polymerization solution started to be continuously added to the reaction solution was continuously added to the second reactor at a rate of 2.31 kg/hr and subjected to secondary continuous polymerization while being allowed to reside for 1.16 hours.

When the first polymerization solution started to be continuously added to the second reactor (when a polymerization conversion rate reached 30%), 0.004 parts by weight of t-dodecyl mercaptan was batch-added to the second reactor.

The second polymerization solution continuously discharged from the second reactor was continuously added to a third reactor (inner temperature: 140° C.) at a rate of 12 kg/hr and subjected to tertiary continuous polymerization while being allowed to reside for 1.16 hours.

The third polymerization solution continuously discharged from the third reactor was continuously added to a fourth reactor (inner temperature: 145° C.) at a rate of 12 kg/hr and subjected to quaternary continuous polymerization while being allowed to reside for 1.16 hours.

After the polymerization was completed, unreacted monomers and the reaction solvent were removed in two steps in a first volatilization tank set at 160° C. and 500 torr and a second volatilization tank set at 230° C. and 10 torr and recovered to prepare a graft polymer pellet.

Example 2

4.42 parts by weight of a butadiene rubber polymer (BR), 7.85 parts by weight of a styrene-butadiene rubber polymer (SBR), 0.15 parts by weight of an antioxidant (Irganox 1076 commercially available from BASF), and 0.01 parts by weight of t-dodecyl mercaptan were dissolved in 30.67 parts by weight of ethylbenzene (EB) and 57.06 parts by weight of styrene (S) to prepare a first reaction solution.

16.222 parts by weight of n-phenylmaleimide (PMI) was dissolved in 83.78 parts by weight of acrylonitrile (AN) to prepare a second reaction solution.

The first reaction solution was continuously added to a first reactor (inner temperature: 105° C.) at a rate of 9.78 kg/hr and subjected to primary continuous polymerization while being allowed to reside for 2.33 hours. In this case, 0.02 parts by weight of t-butylperoxy-2-ethylhexanoate was continuously added together with the first reaction solution to the first reactor at a rate of 0.024 kg/hr.

The first polymerization solution continuously discharged from the first reactor was continuously added to a second reactor (inner temperature: 130° C.) at a rate of 9.78 kg/hr and subjected to secondary continuous polymerization while being allowed to reside for 1.16 hours.

When the first polymerization solution started to be continuously added to the second reactor (when a polymerization conversion rate reached 30%), the second reaction solution was continuously added to the second reactor at a rate of 2.22 kg/hr and subjected to secondary continuous polymerization while being allowed to reside for 1.16 hours.

When the first polymerization solution started to be continuously added to the second reactor (when a polymerization conversion rate reached 30%), 0.004 parts by weight of t-dodecyl mercaptan was batch-added to the second reactor.

The second polymerization solution continuously discharged from the second reactor was continuously added to a third reactor (inner temperature: 140° C.) at a rate of 12 kg/hr and subjected to tertiary continuous polymerization while being allowed to reside for 1.16 hours.

The third polymerization solution continuously discharged from the third reactor was continuously added to a fourth reactor (inner temperature: 145° C.) at a rate of 12 kg/hr and subjected to quaternary continuous polymerization while being allowed to reside for 1.16 hours.

After the polymerization was completed, unreacted monomers and the reaction solvent were removed in two steps in a first volatilization tank set at 160° C. and 500 torr and a second volatilization tank set at 230° C. and 10 torr and recovered to prepare a graft polymer pellet.

Example 3

4.5 parts by weight of a butadiene rubber polymer (BR), 8 parts by weight of a styrene-butadiene rubber polymer (SBR), 0.15 parts by weight of an antioxidant (Irganox 1076 commercially available from BASF), and 0.01 parts by weight of t-dodecyl mercaptan were dissolved in 31.25 parts by weight of ethylbenzene (EB) and 56.25 parts by weight of styrene (S) to prepare a first reaction solution.

25 parts by weight of n-phenylmaleimide (PMI) was dissolved in 75 parts by weight of acrylonitrile (AN) to prepare a second reaction solution.

The first reaction solution was continuously added to a first reactor (inner temperature: 105° C.) at a rate of 9.6 kg/hr and subjected to primary continuous polymerization while being allowed to reside for 2.36 hours. In this case, 0.02 parts by weight of t-butylperoxy-2-ethylhexanoate was continuously added together with the first reaction solution to the first reactor at a rate of 0.024 kg/hr.

The first polymerization solution continuously discharged from the first reactor was continuously added to a second reactor (inner temperature: 130° C.) at a rate of 2.4 kg/hr and subjected to secondary continuous polymerization while being allowed to reside for 1.16 hours.

When the first polymerization solution started to be continuously added to the reaction solution was continuously added to the second reactor at a rate of 9.6 kg/hr and subjected to secondary continuous polymerization while being allowed to reside for 1.16 hours.

When the first polymerization solution started to be continuously added to the second reactor (when a polymerization conversion rate reached 30%), 0.004 parts by weight of t-dodecyl mercaptan was batch-added to the second reactor.

The second polymerization solution continuously discharged from the second reactor was continuously added to a third reactor (inner temperature: 140° C.) at a rate of 12 kg/hr and subjected to tertiary continuous polymerization while being allowed to reside for 1.16 hours.

The third polymerization solution continuously discharged from the third reactor was continuously added to a fourth reactor (inner temperature: 145° C.) at a rate of 12 kg/hr and subjected to quaternary continuous polymerization while being allowed to reside for 1.16 hours.

After the polymerization was completed, unreacted monomers and the reaction solvent were removed in two steps in a first volatilization tank set at 160° C. and 500 torr and a second volatilization tank set at 230° C. and 10 torr and recovered to prepare a graft polymer pellet.

Comparative Example 1

3.6 parts by weight of a butadiene rubber polymer (BR), 6.4 parts by weight of a styrene-butadiene rubber polymer (SBR), 13 parts by weight of acrylonitrile (AN), 0.15 parts by weight of an antioxidant (Irganox 1076 commercially available from BASF), and 0.01 parts by weight of t-dodecyl mercaptan were dissolved in 25 parts by weight of ethylbenzene (EB) and 52 parts by weight of styrene (S) to prepare a first reaction solution.

The first reaction solution was continuously added to a first reactor (inner temperature: 105° C.) at a rate of 12 kg/hr and subjected to continuous polymerization while being allowed to reside for 1.89 hours. In this case, 0.02 parts by weight of t-butylperoxy-2-ethylhexanoate was continuously added together with the first reaction solution to the first reactor at a rate of 0.024 kg/hr.

The first polymerization solution continuously discharged from the first reactor was continuously added to a second reactor (inner temperature: 130° C.) at a rate of 12 kg/hr and subjected to continuous polymerization while being allowed to reside for 1.16 hours.

When the first polymerization solution started to be continuously added to the second reactor (when a polymerization conversion rate reached 28%), 0.004 parts by weight of t-dodecyl mercaptan was batch-added to the second reactor.

The second polymerization solution continuously discharged from the second reactor was continuously added to a third reactor (inner temperature: 140° C.) at a rate of 12 kg/hr and subjected to continuous polymerization while being allowed to reside for 1.16 hours.

The third polymerization solution continuously discharged from the third reactor was continuously added to a fourth reactor (inner temperature: 145° C.) at a rate of 12 kg/hr and subjected to continuous polymerization while being allowed to reside for 1.16 hours.

After the polymerization was completed, unreacted monomers and the reaction solvent were removed in two steps in a first volatilization tank set at 160° C. and 500 torr and a second volatilization tank set at 230° C. and 10 torr and recovered to prepare a graft polymer pellet.

Comparative Example 2

3 parts by weight of N-phenylmaleimide, 3.6 parts by weight of a butadiene rubber polymer (BR), 6.4 parts by weight of a styrene-butadiene rubber polymer (SBR), 0.15 parts by weight of an antioxidant (Irganox 1076 commercially available from BASF), and 0.01 parts by weight of t-dodecyl mercaptan were dissolved in a solution containing 25 parts by weight of ethylbenzene (EB), 49.6 parts by weight of styrene (S), and 12.4 parts by weight of acrylonitrile (AN) to prepare a first reaction solution.

The first reaction solution was continuously added to a first reactor (inner temperature: 105° C.) at a rate of 12 kg/hr and subjected to continuous polymerization while being allowed to reside for 1.89 hours. In this case, 0.02 parts by weight of t-butylperoxy-2-ethylhexanoate was continuously added together with the first reaction solution to the first reactor at a rate of 0.024 kg/hr.

The first polymerization solution continuously discharged from the first reactor was continuously added to a second reactor (inner temperature: 130° C.) at a rate of 12 kg/hr and subjected to continuous polymerization while being allowed to reside for 1.16 hours.

When the first polymerization solution started to be continuously added to the second reactor (when a polymerization conversion rate reached 28%), 0.004 parts by weight of t-dodecyl mercaptan was batch-added to the second reactor.

The third polymerization solution continuously discharged from the third reactor was continuously added to a fourth reactor (inner temperature: 145° C.) at a rate of 12 kg/hr and subjected to continuous polymerization while being allowed to reside for 1.16 hours.

After the polymerization was completed, unreacted monomers and the reaction solvent were removed in two steps in a first volatilization tank set at 160° C. and 500 torr and a second volatilization tank set at 230° C. and 10 torr and recovered to prepare a graft polymer pellet.

Comparative Example 3

5 parts by weight of N-phenylmaleimide, 3.6 parts by weight of a butadiene rubber polymer (BR), 6.4 parts by weight of a styrene-butadiene rubber polymer (SBR), 0.15 parts by weight of an antioxidant (Irganox 1076 commercially available from BASF), and 0.01 parts by weight of t-dodecyl mercaptan were dissolved in a solution containing 25 parts by weight of ethylbenzene (EB), 48 parts by weight of styrene (S), and 12 parts by weight of acrylonitrile (AN) to prepare a first reaction solution.

The first reaction solution was continuously added to a first reactor (inner temperature: 105° C.) at a rate of 12 kg/hr and subjected to continuous polymerization while being allowed to reside for 1.89 hours. In this case, 0.02 parts by weight of t-butylperoxy-2-ethylhexanoate was continuously added together with the first reaction solution to the first reactor at a rate of 0.024 kg/hr.

The first polymerization solution continuously discharged from the first reactor was continuously added to a second reactor (inner temperature: 130° C.) at a rate of 12 kg/hr and subjected to continuous polymerization while being allowed to reside for 1.16 hours.

When the first polymerization solution started to be continuously added to the second reactor (when a polymerization conversion rate reached 28%), 0.004 parts by weight of t-dodecyl mercaptan was batch-added to the second reactor.

The second polymerization solution continuously discharged from the second reactor was continuously added to a third reactor (inner temperature: 140° C.) at a rate of 12 kg/hr and subjected to continuous polymerization while being allowed to reside for 1.16 hours.

The third polymerization solution continuously discharged from the third reactor was continuously added to a fourth reactor (inner temperature: 145° C.) at a rate of 12 kg/hr and subjected to continuous polymerization while being allowed to reside for 1.16 hours.

After the polymerization was completed, unreacted monomers and the reaction solvent were removed in two steps in a first volatilization tank set at 160° C. and 500 torr and a second volatilization tank set at 230° C. and 10 torr and recovered to prepare a graft polymer pellet.

Experimental Example 1

The properties of the graft polymer pellets according to Examples and Comparative Examples were measured by the methods described below, and results thereof are shown in Table 1 and Table 2 below.

(1) N-phenylmaleimide (PMI) monomer units (wt %) and acrylonitrile (AN) monomer units (wt %): primarily measured by elemental analysis using an element analyzer (FLASH 2000 commercially available from Thermo Scientific).

Specifically, the content of "oxygen (O)" was analyzed to calculate the content of N-phenylmaleimide monomer units (wt %), and the content of "nitrogen (N)" was analyzed to calculate the content of acrylonitrile monomer units (wt %).

Subsequently, secondary measurement was performed using a Fourier-transform infrared spectrometer (Nicolet iS50 FT-IR spectrometer commercially available from Thermo Scientific), and then a calibration curve was obtained. Then, a N-phenylmaleimide monomer unit content and an acrylonitrile monomer unit content were calculated using Fourier-transform infrared spectroscopy.

(2) Vicat softening temperature (° C.): measured in accordance with ASTM D1525.

(3) Glass transition temperature (° C.): measured using a differential scanning calorimeter (DSC Q20 commercially available from TA Instruments).

(4) b value: measured using a SM-T45 S&M Colour Meter.

Experimental Example 2

99 parts by weight of each graft polymer according to Examples and Comparative Examples and 1 part by weight of a coloring agent (MB 5093 commercially available from Muil Chemical) were mixed, then extruded, and injected to prepare a sample, the properties thereof were measured by the methods described below, and results thereof are shown in Table 1 and Table 2 below.

(1) Gray scale (PV1303 test): after allowing the sample to stand under conditions of UVA 300~400 nm, 600 W/m$^2$ (1 cycle 14 MJ/m$^2$), and 100° C. (black standard temperature) for 195 hours, the color change and gloss of the injection surface were determined, and grades from 1 to 5 were given.

(2) Gloss (60°): measured using a glossmeter after the PV1303 test.

TABLE 1

| | Classification | | Example 1 | Example 2 | Example 3 |
|---|---|---|---|---|---|
| First reactor | First reaction solution | EB (parts by weight) | 30.96 | 30.67 | 31.25 |
| | | S (parts by weight) | 56.66 | 57.06 | 56.25 |
| | | BR (parts by weight) | 4.46 | 4.42 | 4.5 |
| | | SBR (parts by weight) | 7.92 | 7.85 | 8 |
| | | Addition rate (kg/hr) | 9.69 | 9.78 | 9.6 |
| | | Residence time (hours) | 2.35 | 2.33 | 2.36 |
| | Second reaction solution | AN (parts by weight) | 79.22 | 83.78 | 75 |
| | | PMI (parts by weight) | 20.78 | 16.22 | 25 |
| | | Addition rate (kg/hr) | 2.31 | 2.20 | 2.40 |
| | | Residence time (hours) | 1.16 | 1.16 | 1.16 |

TABLE 1-continued

| | Classification | Example 1 | Example 2 | Example 3 |
|---|---|---|---|---|
| Total content of monomers added in polymerization | S (wt %) | about 61.00 | about 61.90 | 60.00 |
| | BR (wt %) | about 4.80 | about 4.80 | 4.80 |
| | SBR (wt %) | about 8.53 | about 8.52 | about 8.53 |
| | AN (wt %) | about 20.33 | about 20.63 | 20 |
| | PMI (wt %) | about 5.34 | about 4.16 | about 6.67 |
| Graft polymer | AN monomer units (wt %) | 19.3 | 19.5 | 19.1 |
| | PMI monomer units (wt %) | 5.2 | 4.5 | 6.1 |
| | Vicat softening temperature | 108.5 | 107.6 | 110.1 |
| | Glass transition temperature | 116.9 | 115.6 | 118.1 |
| | b value | −5.20 | −5.89 | −4.8 |
| Sample | Gray scale | 4 | 3~4 | 4 |
| | Gloss (60°) | 2.8 | 3.5 | 2.8 |

TABLE 2

| | Classification | | Comparative Example 1 | Comparative Example 2 | Comparative Example 3 |
|---|---|---|---|---|---|
| First reactor | First reaction solution | EB (parts by weight) | 25 | 25 | 25 |
| | | S (parts by weight) | 52 | 49.6 | 48 |
| | | AN (parts by weight) | 13 | 12.4 | 12 |
| | | PMI (parts by weight) | 0 | 3 | 5 |
| | | BR (parts by weight) | 3.6 | 3.6 | 3.6 |
| | | SBR (parts by weight) | 6.4 | 6.4 | 6.4 |
| | | Addition rate (kg/hr) | 12 | 12 | 12 |
| | | Residence time (hours) | 1.89 | 1.89 | 1.89 |
| | Second reaction solution | PMI (parts by weight) | — | — | — |
| | | AN (parts by weight) | — | — | — |
| | | Addition rate (kg/hr) | — | — | — |
| | | Residence time (hours) | — | — | — |
| Total content of monomers added in polymerization | | S (wt %) | about 69.33 | about 66.13 | 64 |
| | | BR (wt %) | 4.8 | 4.8 | 4.8 |
| | | SBR (wt %) | about 8.54 | about 8.54 | about 8.53 |
| | | AN (wt %) | about 17.33 | about 16.53 | 16 |
| Graft polymer | | PMI (wt %) | 0 | 4 | about 6.67 |
| | | AN monomer units (wt %) | 20.5 | 16.5 | 16.7 |
| | | PMI monomer units (wt %) | 0 | 4.2 | 5.5 |
| | | Vicat softening temperature | 102.5 | 106.5 | 108.6 |
| | | Glass transition temperature | 109.4 | 114.1 | 117.0 |
| | | b value | −6.45 | −3.92 | −1.79 |
| Sample | | Gray scale | 2 | 2 | 2~3 |
| | | Gloss (60°) | 5.0 | 4.2 | 3.9 |

Referring to Table 1 and Table 2, Example 1 to Example 3 exhibited high Vicat softening temperatures, high glass transition temperatures, low b values, excellent gray scale, and excellent matte characteristics. Meanwhile, Comparative Example 1, in which secondary continuous polymerization was not performed and N-phenylmaleimide was not used as a monomer, exhibited a low Vicat softening temperature, a low glass transition temperature, poor gray scale, and poor matte characteristics. Comparative Example 2, in which not only secondary continuous polymerization was not performed but also relatively small amounts of N-phenylmaleimide and acrylonitrile were added in polymerization, exhibited poor gray scale and poor matte characteristics.

In addition, Comparative Example 3, in which secondary continuous polymerization was not performed, was excellent in a Vicat softening temperature and a glass transition temperature because an excessive amount of N-phenylmaleimide was added in polymerization, but it exhibited poor color characteristics, poor gray scale, and poor matte characteristics due to N-phenylmaleimide. Also, since it was difficult to control heat during polymerization when acrylonitrile was added at a similar level to that in Examples, only 16 wt % was added.

The invention claimed is:
1. A method of preparing a graft polymer, comprising:
performing primary continuous polymerization by adding a diene-based rubber polymer and an aromatic vinyl-based monomer to a first reactor; and performing secondary continuous polymerization by adding the polymerization product discharged from the first reactor, a maleimide-based monomer, and a vinyl cyanide-based monomer to a second reactor, wherein the adding of the polymerization product, the maleimide-based monomer, and the vinyl cyanide-based monomer starts when a polymerization conversion rate reaches 25 to 35%.

2. The method of claim 1, wherein the maleimide-based monomer is added in a dissolved state in the vinyl cyanide-based monomer.

3. The method of claim 2, wherein a weight ratio of the maleimide-based monomer and the vinyl cyanide-based monomer is 15:85 to 25:75.

4. The method of claim 1, wherein an amount of the maleimide-based monomer added in the secondary continuous polymerization is 1 to 10 parts by weight with respect to 100 parts by weight, in total, of the diene-based rubber polymer, the aromatic vinyl-based monomer, the maleimide-based monomer, and the vinyl cyanide-based monomer added in the preparing of the graft polymer.

5. The method of claim 1, wherein an amount of the vinyl cyanide-based monomer added in the secondary continuous polymerization is 15 to 27 parts by weight with respect to 100 parts by weight, in total, of the diene-based rubber polymer, the aromatic vinyl-based monomer, the maleimide-based monomer, and the vinyl cyanide-based monomer added in the preparing of the graft polymer.

6. The method of claim 1, wherein an amount of the diene-based rubber polymer added in the primary continuous polymerization is 7 to 17 parts by weight with respect to 100 parts by weight, in total, of the diene-based rubber polymer, the aromatic vinyl-based monomer, the maleimide-based monomer, and the vinyl cyanide-based monomer added in the preparing of the graft polymer.

7. The method of claim 1, wherein an amount of the aromatic vinyl-based monomer added in the primary continuous polymerization is 55 to 67 parts by weight with respect to 100 parts by weight, in total, of the diene-based rubber polymer, the aromatic vinyl-based monomer, the maleimide-based monomer, and the vinyl cyanide-based monomer added in the preparing of the graft polymer.

8. The method of claim 1, wherein the diene-based rubber polymer is added in a dissolved state in the aromatic vinyl-based monomer.

9. The method of claim 1, wherein the diene-based rubber polymer is one or more selected from the group consisting of a butadiene rubber polymer and a styrene-butadiene rubber polymer.

10. The method of claim 1, wherein the primary and secondary continuous polymerizations are each a continuous bulk polymerization.

* * * * *